(12) United States Patent
Kinloch et al.

(10) Patent No.: US 7,767,615 B2
(45) Date of Patent: Aug. 3, 2010

(54) METHOD FOR PRODUCING CARBON NANOTUBES AND/OR NANOFIBRES

(75) Inventors: Ian Kinloch, Cambridge (GB); Charanjeet Singh, Durham (GB); Milo Sebastian Peter Shaffer, London (GB); Krzysztof K. K. Koziol, Katowice (PL); Alan Windle, Cambridge (GB)

(73) Assignee: Cambridge University Technical Services Limited, Cambridge (GB)

( * ) Notice: Subject to any disclaimer, the term of this patent is extended or adjusted under 35 U.S.C. 154(b) by 628 days.

(21) Appl. No.: 10/534,900

(22) PCT Filed: Nov. 13, 2003

(86) PCT No.: PCT/GB03/04925

§ 371 (c)(1),
(2), (4) Date: Oct. 7, 2005

(87) PCT Pub. No.: WO2004/043858

PCT Pub. Date: May 27, 2004

(65) Prior Publication Data

US 2006/0133982 A1  Jun. 22, 2006

(30) Foreign Application Priority Data

Nov. 14, 2002  (GB) .................. 02265908

(51) Int. Cl.
  B01J 23/40 (2006.01)
  B01J 23/74 (2006.01)
  D01C 5/00 (2006.01)
  D01F 9/12 (2006.01)

(52) U.S. Cl. ................ 502/185; 423/447.3; 423/447.5; 977/742; 977/745; 977/748; 977/750; 977/751

(58) Field of Classification Search ................ 502/185; 423/447.3, 447.5; 977/742, 745, 748, 750, 977/752

See application file for complete search history.

(56) References Cited

U.S. PATENT DOCUMENTS 4,572,813 A * 2/1986 Arakawa .................. 264/29.2

(Continued)

FOREIGN PATENT DOCUMENTS

JP  2004-055158  * 2/2004

(Continued)

OTHER PUBLICATIONS

"Vertically aligned carbon nanotubes grown on geometrically different types of surface," S. G. Wang et al. Diamond and Related Materials 12 (2003), pp. 2175-2177.*

(Continued)

Primary Examiner—Patricia L Hailey
(74) Attorney, Agent, or Firm—Goodwin Procter LLP

(57) ABSTRACT

A method for producing aligned carbon nanotubes and/or nanofibres comprises providing finely divided substrate particle having substantially smooth faces with radii of curvature of more than 1 μm and of length and breadth between 1 μm and 5 mm and having catalyst material on their surface and a carbon-containing gas at a temperature and pressure at which the carbon-containing gas will react to form carbon when in the presence of the supported catalyst, and forming aligned nanotubes and/or nanofibres by the carbon-forming reaction.

24 Claims, 3 Drawing Sheets

U.S. PATENT DOCUMENTS

| | | | | |
|---|---|---|---|---|
| 5,973,444 | A * | 10/1999 | Xu et al. | 313/309 |
| 6,413,487 | B1 * | 7/2002 | Resasco et al. | 423/447.3 |
| 6,692,717 | B1 * | 2/2004 | Smalley et al. | 423/445 B |
| 6,855,376 | B2 * | 2/2005 | Hwang et al. | 427/404 |
| 6,967,013 | B2 * | 11/2005 | Someya et al. | 423/447.3 |
| 7,033,647 | B2 * | 4/2006 | Tang et al. | 427/533 |
| 7,160,532 | B2 * | 1/2007 | Liu et al. | 423/447.3 |
| 7,161,286 | B2 * | 1/2007 | Liu et al. | 313/311 |

FOREIGN PATENT DOCUMENTS

| | | | |
|---|---|---|---|
| WO | WO 00/17102 | * | 3/2000 |

OTHER PUBLICATIONS

"Catalyst effect on carbon nanotubes synthesized by thermal chemical vapor deposition," Cheol Jin Lee et al. Chemical Physics Letters 360 (2002) 250-255.*

"Carbon nanotube synthesis on catalytic metal alloys in methane/air counterflow diffusion flames," Fusheng Xu et al. Proceedings of the Combustion Institute 31 (2007), pp. 1839-1847.*

"Production of aligned carbon nanotubes by the CVD injection method," Charanjeet Singh et al. Physica B 323 (2002), pp. 339-340.*

"Growth Model for Bamboolike Structured Carbon Nanotubes Synthesized Using Thermal Chemical Vapor Deposition", Cheol Jin Lee et al. J. Phys. Chem. B 2001, 105, pp. 2365-2368.*

* cited by examiner

METHOD FOR PRODUCING CARBON NANOTUBES AND/OR NANOFIBRES

This application is the national stage of International (PCT) Patent Application Ser. No. PCT/GB2003/004925, filed Nov. 13, 2003, which claims priority to British Application No. 0226590.8, filed Nov. 14, 2002, the disclosure of each of which is incorporated herein by reference.

The present invention relates to a method of producing carbon nanotubes and/or nanofibres, and to nanotubes and/or nanofibres so produced.

Carbon nanotubes are tubular fullerenic structures which may be single-walled or multi-walled. Carbon nanofibres are fullerenic nanostructures in which the graphitic layers are not tubular: for example, solid fullerenic cylinders or hollow cylindrical fullerenic structures wherein the fullerene net is not parallel to the cylinder axis.

Carbon nanotubes and nanofibres have remarkable mechanical and electrical properties and are being investigated for many potential applications. These materials have been produced previously by using various approaches, including laser or arc-discharge ablation of a carbon/catalyst mixture target. The materials are usually produced in an entangled state.

For larger scale synthesis, the most promising methods have been based on chemical vapour decomposition (CVD). In these methods, a carbon containing gas is decomposed at high temperature under the influence of a finely divided transition metal catalyst.

Large quantities of multi-walled nanotubes can be grown using CVD by methods well known in the literature (H. G. Tennant, U.S. Pat. No. 5,165,909). However, this material, sometimes termed 'cotton candy', is highly entangled, a characteristic that reduces its utility in certain applications (for example, this material is not readily dispersible as a filler). In addition, nanotubes grown in this way do not have a clearly defined length and often have to be broken up into shorter sections using aggressive chemical treatments (e.g. boiling in concentrated nitric acid) in order to achieve a good dispersion (Shaffer). Particulate substrates have also been used as catalyst supports for growing entangled nanotubes (e.g. WO00/17102).

WO00/73205 discloses a method for producing carbon nanotubes from carbon monoxide gas using silica-supported cobalt and molybdenum as a catalyst. The single-walled nanotubes produced are locally roughly aligned in bundles but each nanotube travels between different bundles and the material is thus entangled.

Multi-walled nanotubes have also been grown on nonparticulate substrates (usually quartz plates or furnace tubes with diameters between 15 mm and 100 mm) in order to form aligned arrays, also known as 'carpets', 'forests', or 'grass' (e.g. Andrews). The process usually involves the thermal decomposition of ferrocene/toluene mixtures at 600-1000° C. although a variety of related feedstocks may be used. By varying processing parameters such as time, temperature, and catalyst concentration it is possible to adjust the length, diameter, and packing density of the nanotubes formed within certain ranges (e.g. Singh). Aligned nanotubes have also widely been prepared on flat substrates by using various types of plasma enhancement (for example microwave, radio-frequency or direct current) (e.g. Ren). Aligned nanotubes grown by thermal CVD often have a higher crystalline quality than their 'cotton candy' counterparts.

The present invention provides in a first aspect a method for producing aligned carbon nanotubes and/or nanofibres comprising providing finely divided substrate particles having substantially smooth faces with radii of curvature of more than 1 μm and of length and breadth between 1 μm and 5 mm having a catalyst material on their surface and a carbon-containing gas at a temperature and pressure at which the carbon-containing gas will react to form carbon when in the presence of the supported catalyst, and forming aligned nanotubes and/or nanofibres by the carbon-forming reaction.

At the nanometer scale (less than 100 nm), the surface may have a texture or roughness that stabilises metal catalyst clusters of suitable sizes for nanotube and/or nanofibre growth. The surface should be smooth over the order of size of catalyst material clusters.

Preferably, the faces have radii of curvature of more than 10 μm. More preferably, the substantially smooth faces are substantially flat.

Preferably, the catalyst material is dispersed in clusters on the surface of the substrate particles. More preferably, the catalyst material clusters are from 0.5 nm to 100 nm in dimension. Highly preferably, the catalyst material clusters are from 3 nm to 50 nm in dimension.

Optionally, the substrate particles having catalyst material on their surface are prepared by depositing catalyst material on the surface of the substrate particles.

Metal or metal salts may be introduced onto the substrate particles by a range of treatments including electroless deposition, solvent drying, supercritical drying, sputtering, physical vapour deposition, or electroplating. Subsequent thermal and/or oxidising or reducing gas treatments may be used in converting a given salt to a metal or to a suitable precursor for thermal decomposition (see below). Continuous films may be broken up on thermal treatment to form suitable catalyst particles by a dewetting process.

Alternatively, the substrate particles having catalyst material on their surface may be prepared by providing finely divided substrate particles and a catalyst precursor material and decomposing the catalyst precursor material to form the catalyst material in the presence of the substrate particles such that the catalyst material is deposited on the substrate particles. In a preferred embodiment of the invention, the catalyst precursor material is decomposed while the substrate particles are in contact with the carbon-containing gas, for example within the main CVD furnace.

As a further alternative, the substrate particles having catalyst material on their surface may be prepared by providing finely divided substrate particles of a material that is decomposable to form catalyst material on the surface of non-catalyst substrate particles and decomposing said material. Some perovskites are known to behave in this way (e.g. Liang).

Preferably, the length and breadth of the substrate particle faces are between 10 μm and 500 μm. If the particle is facetted, the majority of facets are preferably more than 25 μm$^2$ in area and most preferably wider than 2 μm in each direction.

The substrate may be, by way of example, ceramic (silica or alumina), mineral (mica), metallic (titanium), salt (sodium chloride, magnesium oxide, calcium oxide) or carbon-based. The substrate particles may be of graphite, aluminium or titanium. Preferably, the substrate particles are of silica, carbon, magnesium oxide, calcium oxide, or sodium chloride. In the most straightforward case, the substrate particles are simply finely ground powders, such as silica or alumina, or drawn aluminosilicate fibres, or processed minerals such as mica. Other materials may be generated by a range of methods, known to those skilled in the art, such as colloidal processing, spray-drying, hydrothermal processing, ball-milling extrusion and so on. Freshly prepared materials with uncontaminated surfaces (e.g. as obtained by prompt use of ball milled silica, milled using silica-based balls) are preferably used in order to obtain best results. Preferably, the materials are used within a day of preparation.

Preferably, the substrate particles are anisotropic in order to provide a large surface area to volume ratio. More preferably, the substrate particles have one dimension larger than the other two dimensions or the substrate particles have one dimension smaller than the other two dimensions.

Optionally, the substrates are coated with a buffer layer. The buffer layer on the surface of the substrate particles serves either to support or enhance the catalyst particles or to isolate the growth process from the underlying material. As an example, such an approach could be useful when using a substrate that is convenient to remove after the growth reaction but which has a relatively high solubility for the catalyst metal (such as a magnesium oxide/nickel system). Such a buffer layer may be introduced by deliberate treatment (Sun) or may arise naturally (e.g. the oxide layer on titanium particles).

Preferably, the catalyst material is a transition metal, an alloy of two or more thereof, a compound of a transition metal or a mixture of two or more compounds of transition metals. Particularly suitable are the Group VIB chromium (Cr), molybdenum (Mo), tungsten (W) or Group VIIIB transition metals, e.g., iron (Fe), cobalt (Co), nickel (Ni), ruthenium (Ru), rhodium (Rh), palladium (Pd), osmium (Os), iridium (Ir) and platinum (Pt) or mixtures thereof. Metals from the lanthanide and actinide series may also be used. More preferably, the transition metal is iron, cobalt, molybdenum or nickel or mixtures thereof.

Preferably, the catalyst precursor is a transition metal carbonyl, or a transition metal cyclopentadienyl compound. More preferably, the catalyst precursor is ferrocene, nickelocene, cobaltocene, iron pentacarbonyl or nickel tetracarbonyl. The catalyst precursor compound may provide the carbon-containing gas, for example where ferrocene is used to provide iron catalyst and cyclopentadiene carbon-containing gas.

Preferably, the carbon containing gas is carbon monoxide, an oxygen containing organic compound or a hydrocarbon, or a mixture of two or more thereof. More preferably, the carbon containing gas is carbon monoxide, benzene, toluene, xylene, cumene, ethylbenzene, naphthalene, phenanthrene, anthracene, methane, ethane, propane, hexane, ethylene, propylene, acetylene, formaldehyde, acetaldehyde, acetone, methanol, ethanol or a mixture of two or more thereof. In preferred embodiments, the carbon-containing compound is toluene, xylene or benzene. It is of course only required that the reactant be gaseous under the reaction conditions.

Optionally, one or more boron and/or nitrogen containing compound is provided in addition to the carbon containing gas. It has been shown in flat substrate studies that boron or nitrogen can be introduced into the carbon lattice (Terrones), by using boron or nitrogen containing species in the feedstock for the CVD reaction. Accordingly, it is possible to grow large volumes of such 'doped' materials using this invention by the addition of suitable species, such as ammonia, pyridine, aniline, borazine, borane, phthalocyanines, to the feedstock.

Optionally, one or more promoter compounds is provided in addition to the carbon containing gas. Promoters aid the catalytic selectivity or reactivity. These agents may be added as the catalyst is formed or during growth of the nanotubes and/or nanofibres. For example, thiophene may be added to encourage the production of herringbone fibres or single-walled nanotubes (Singh, Zhu).

Optionally, a diluent gas is provided mixed with the carbon containing gas. The diluent is preferably an inert gas, e.g. argon. The carbon-containing gas may also be mixed with non carbon-containing gases that play no direct role in the carbon-forming reaction but which play a contributory role, for instance by reacting with amorphous carbon as it is formed (as a by-product) and so keeping the reaction sites on the catalyst clean and available for nanotube formation. Gases which may be mixed with the carbon-containing gas include argon, hydrogen, nitrogen, ammonia, or helium.

The substrate particles may be introduced into the CVD reactor batchwise, or added to the furnace continuously either using standard powder handling techniques or by carrying in a suitable gas (see PCT/GB02/02239). Preferably, substrate particles are provided and product particles are removed from a reaction vessel in a continuous fashion. Once introduced to the furnace, the substrate particles may sit in a fixed bed, a fluidised bed, or be carried within the gas flows in the system.

Preferably, the method described above further comprises the step of recovering the aligned nanotubes and/or nanofibres.

Preferably, gaseous effluent from the reaction is recycled with or without clean up.

Suitably, formation of the nanotubes and/or nanofibres takes place at a temperature of from 650° C. to 1250° C., e.g. 650° C. to 850° C. Preferred gas pressures are from 0.1 to 50 bar A, preferably from 0.5 to 5 bar A, more preferably 1 to 2 bar A. The ratio of catalyst metal to carbon fed to the reaction zone is preferably less than 1:100, e.g. 1:100 to 1:500.

In a second aspect, the invention relates to finely divided substrate particles having substantially smooth faces with radii of curvature of more than 1 μm and of length and breadth between 1 μm and 5 mm with a catalyst material on the surface of the substrate particles and with aligned carbon nanotubes and/or nanofibres on the surface of the substrate particles. The nanotube and/or nanofibre coated substrate particles may be used directly (with either or both components contributing to a desired active or passive functionality).

Alternatively, the nanotubes or nanofibres may be removed from the substrate by dissolution of the substrate (e.g. hydrogen fluoride treatment of silica, or hydrothermal treatment of sodium chloride) or by dissolution of the catalyst or buffer layers (e.g. iron in dilute hydrochloric acid). The now disconnected nanotubes and/or nanofibres and substrates may be conveniently separated by filtration or sedimentation. In particular the disconnected materials may be placed in a medium of intermediate density such that the substrate particles sink and the nanotubes and/or nanofibres rise (or vice versa). After separation, the substrate particles may be reused.

In a third aspect, the invention relates to nanotubes and/or nanofibres produced by a method as described above. Preferably, the nanotubes and/or nanofibres are separated from the substrate particles by partial or complete dissolution of the substrate particles or catalyst materials.

The invention will be further described with reference to the following Example and with reference to the Figures, in which.

EXAMPLE

Figure 1:
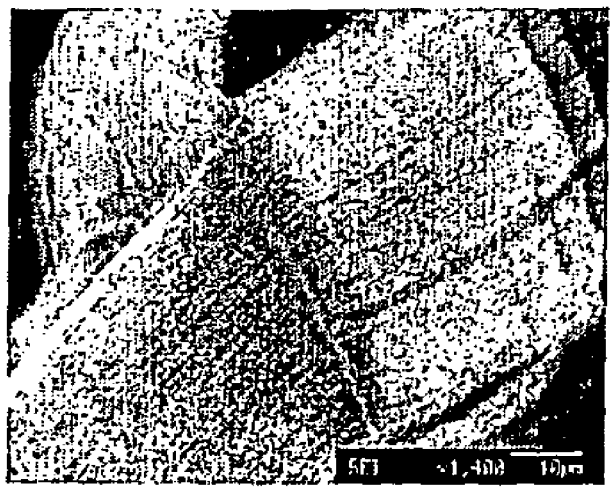
FIG. 1 shows an SEM image of aligned nanotubes grown on quartz substrate at ~700° C. for 90 minutes.

A solution containing 2 wt % of ferrocene dissolved into toluene was prepared. 100 mg of high surface area quartz powder was prepared by ball milling. Milling time was 2 hours using alumina ball-bearings. The silica broke up into flakes approximately 10 to 40 μm in diameter and around 1 μm thick. The ground silica was sorted with a 75 μm sieve. The fine powder was then placed into a horizontal tube furnace (internal diameter 14 mm, length 90 cm) and heated to 700° C. The solution was sprayed into the furnace at 1.2 ml hr$^{-1}$ using a dry argon-hydrogen atmosphere for 90 minutes. The ratio of argon to hydrogen was 14:1 with a total gas flow rate of 750 ml min$^{-1}$. The products were characterised by electron microscopy, both scanning (SEM) and high-resolution transmission electron microscopy (HRTEM), and Raman spectroscopy and Thermogravimetric analysis (TGA). From FIG. 1 it can be seen that the nanotubes are in abundance, high purity, and aligned with constant lengths. The nanotubes are mainly in the bundled form growing perpendicular to the surface of the support. The average diameters of the nanotubes were 27±2.7 nm determined using TEM.

Figure 2:
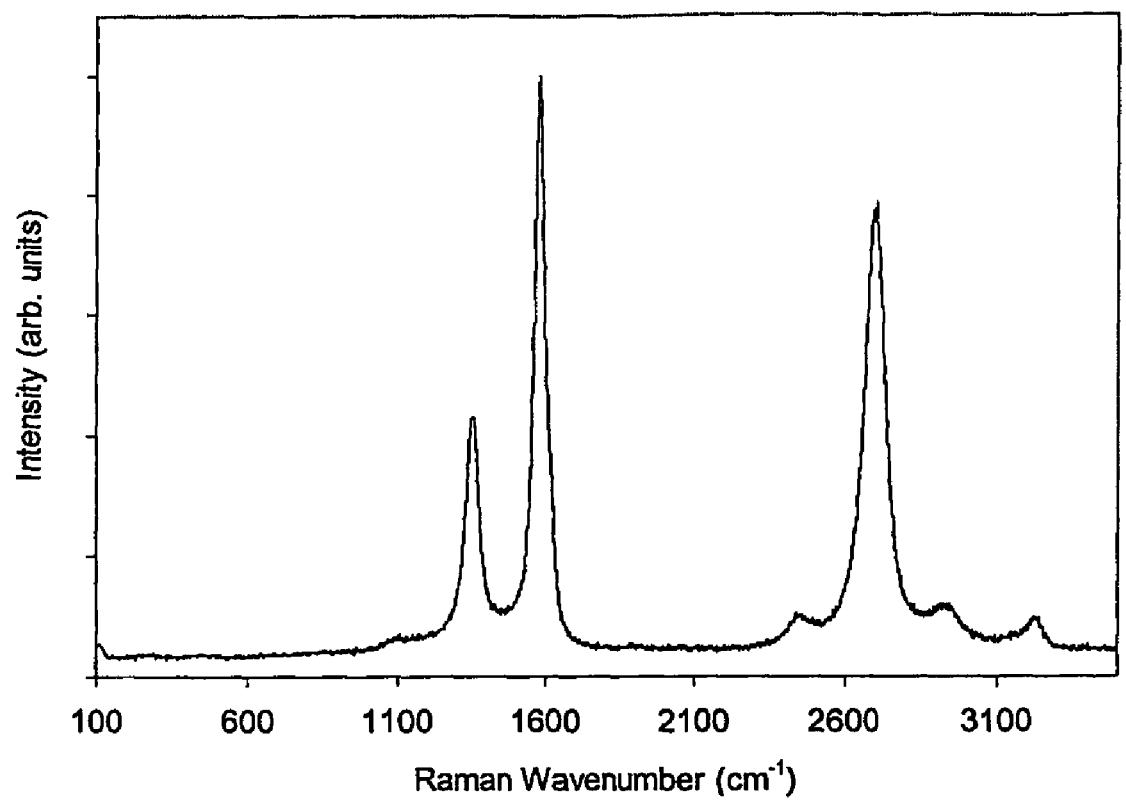
FIG. 2 shows a Raman spectrum taken from the nanotubes grown at 700° C. taken using a 514 nm excitation laser.
Figure 3:
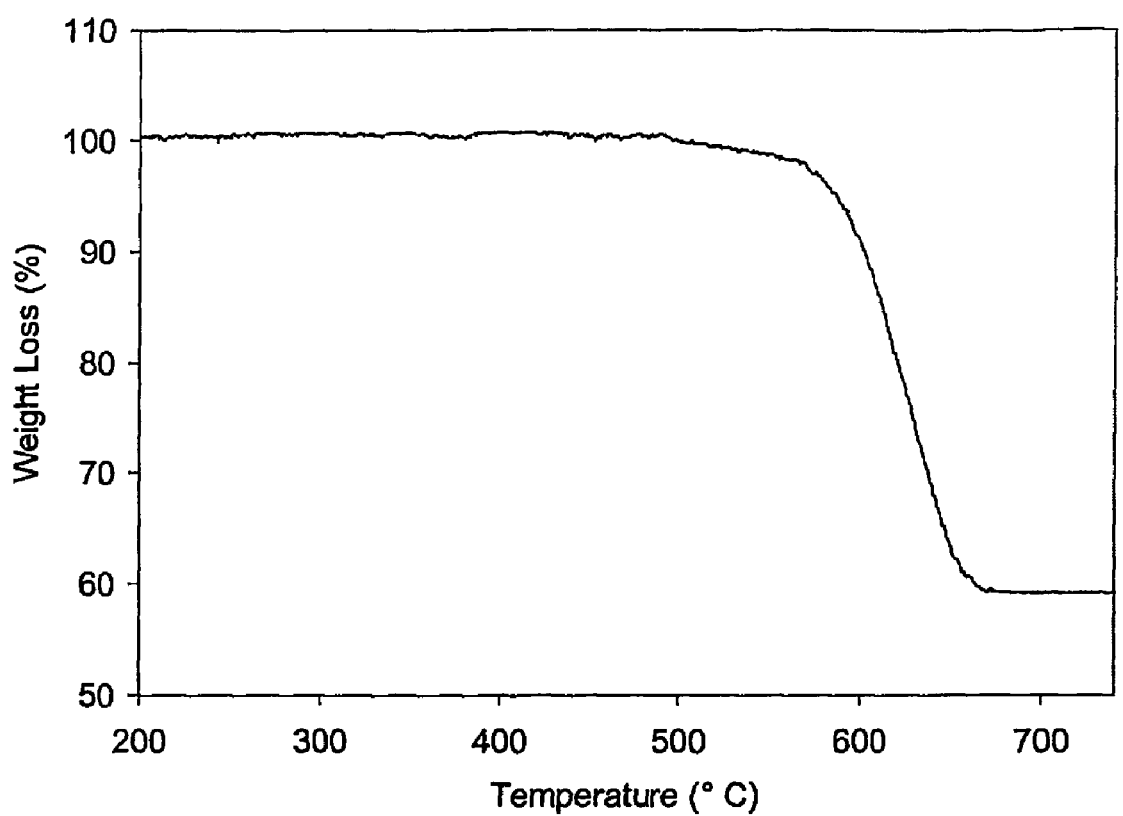
FIG. 3 shows TGA on nanotubes grown at 700° C. for 90 minutes, 750 ml min$^{-1}$ Ar:H$_2$ flow rate and at a feed rate 1.2 ml hr$^{-1}$ of the solution.

In FIG. 2 the quality of the material based upon the relative intensity of the peak at ~1350 cm$^{-1}$ to ~1580 cm$^{-1}$ indicates that the nanotubes contain few defects. TGA (FIG. 3) indicates that approximately 40% of the weight loss was due to the nanotubes. The remaining powder was iron oxide supported on quartz. The average weight loss from TGA was ~32.5%.

The advantages of the technique of the Example for large scale production of carbon nanotubes are summarised as follows:
1. Low production cost: the raw materials involved for forming the support, catalyst and carbon feedstock are cheap and readily available in large quantities.
2. The method results in high volumes and high yield of good quality pure nanotubes, and can readily be scaled up to an industrial level.
3. Characteristics such as nanotube/nanofibre diameter and length can be manipulated by the growth process.

The disadvantage of known flat substrate methods of production compared with the method of the Example is that the ratio between the growing surface area and volume of support is low as a result of the geometry of the plates. Because the growth is confined to a macroscopic surface the total volumetric yield of product is low.

The disadvantage of the method of WO00/73205 compared with the method of the Example is that aligned, non-entangled nanotubes are not produced. This is apparently because the substrate particles used in that method do not have the required characteristics.

Whilst the applicants do not wish to be bound by this theory, it is believed that during growth the aligned nanotube or nanofibre arrays grow from all sides of the substrate particle, leading to a large volume of carbon product. During growth the substrate particles move apart in order to accommodate the growing nanotubes.

REFERENCES

Andrews, R., Jacques, D., Rao, A. M., Derbyshire, F., Qian, D., Fan, X., Dickey, E. C., and Chen, J., *Continuous production of aligned carbon nanotubes: a step closer to commercial realization*. Chemical Physics Letters, 1999. 303 (5-6): p. 467-474.

Ren, Z. F., Huang, Z. P., Xu, J. W., Wang, J. H., Bush, P., Siegal, M. P., and Provencio, P. N., *Synthesis of large arrays of well-aligned carbon nanotubes on glass*. Science, 1998. 282(5391): p. 1105-1107.

Liang, Q., Tang, S. H., Gao, L. Z., Chen, Z. Y., Zhang, B. L., Yu, Z. L., *A study on production of carbon nanotubes by decomposition of CH$_4$ over the pre-reduced catalysts LaNiO$_3$, La$_4$Ni$_3$O$_{10}$, La$_3$Ni$_2$O$_7$ and La$_2$NiO$_4$*, Acta Chim. Sin., 2001, 59, 8, p. 1236-1240.

Sun, X., Stansfield, B., Dodelet, J. P., Desilets, S., *Growth of carbon nanotubes on carbon paper by ohmically heating silane-dispersed catalytic sites*, Chem. Phys. Lett. 363 (2002) 415-421.

Production of aligned carbon nanotubes by the CVD injection method, Singh C, Shaffer M, Kinloch I, and Windle A, Physica B, Vol 323, No. 1-4, 339-340, 2002

Shaffer M S P, Fan X, Windle A H, Dispersion and packing of carbon nanotubes, Carbon, 1998, Vol. 36, No. 11, 1603-1612

Terrones, M., Benito, A. M., MantecaDiego, C., Hsu, W. K., Osman, O. I., Hare, J. P., Reid, D. G., Terrones, H., Cheetham, A. K., Prassides, K., Kroto, H. W., and Walton, D. R. M., Pyrolytically grown BxCyNz nanomaterials: Nanofibres and nanotubes. Chemical Physics Letters, 1996. 257(5-6): p. 576-582.

Terrones, M., Redlich, P., Grobert, N., Trasobares, S., Hsu, W. K., Terrones, H., Zhu, Y. Q., Hare, J. P., Reeves, C. L., Cheetham, A. K., Ruhle, M., Kroto, H. W., and Walton, D. R. M., Carbon nitride nanocomposites: Formation of aligned CxNy nanofibers. Advanced Materials, 1999. 11(8): p. 655

Singh, C., Quested, T., Boothroyd, C., Thomas, P., Kinlock, I., Abou Kandil, A., Windle, A. H., *Synthesis and characterisation of carbon nanofibres produced by the floating catalyst method*, J. Phys. Chem. B., 2002, 106, p. 10915-10922.

Zhu, H. W., Xu, C. L., Wu D. H., Wei B. Q., Vajtai R., Ajayan P. M., Direct synthesis of single-walled carbon nanotube strands, Science, 2002, 296, 884-886

The invention claimed is:

1. A method for producing aligned carbon nanostructures comprising:
  (a) providing (i) finely divided substrate particles having substantially smooth faces with radii of curvature of more than 1 μm and of length and breadth between 1 μm and 5 mm and having a catalyst material on their surface and (ii) a carbon-containing gas at a temperature and pressure at which the carbon-containing gas will react to form carbon when in the presence of the catalyst material, and
  (b) forming aligned nanostructures by the carbon-forming reaction,
  wherein the substrate particles are of silica, alumina, carbon, mica, magnesium oxide, calcium oxide, sodium chloride, or a mixture of two or more thereof, or are of graphite, aluminium, or titanium,
  and further wherein the substrate particles are freshly prepared by colloidal processing, spray-drying, hydrothermal processing, or ball milling,
  and further wherein the substrate particles having the catalyst material on their surface are prepared by depositing the catalyst material on the surface of the substrate particles by electroless deposition, solvent drying, supercritical drying, sputtering, physical vapour deposition or electroplating, and further wherein the catalyst material is a transition metal, an alloy of two or more thereof, a compound of a transition metal or a mixture of two or more compounds of transition metals, where the transition metal is iron, cobalt, molybdenum or nickel.

2. A method as claimed in claim 1, wherein the faces have radii of curvature of more than 10 µm.

3. A method as claimed in claim 1, wherein the substantially smooth faces are substantially flat.

4. A method as claimed in claim 1, wherein the catalyst material is dispersed in clusters on the surface of the substrate particles.

5. A method as claimed in claim 4, wherein the catalyst material clusters are from 0.5 nm to 100 nm in dimension.

6. A method as claimed in claim 5, wherein the catalyst material clusters are from 3 nm to 50 nm in dimension.

7. A method as claimed in claim 1, wherein the length and breadth of the substrate particle faces are between 10 µm and 500 µm.

8. A method as claimed in claim 1, wherein the substrate particles are anisotropic.

9. A method as claimed in claim 8, wherein the substrate particles have one dimension larger than the other two dimensions or wherein the substrate particles have one dimension smaller than the other two dimensions.

10. A method as claimed in claim 1, where the substrates are coated with a buffer layer.

11. A method as claimed in claim 1, wherein the catalyst material is ferrocene, nickelocene, cobaltocene, iron pentacarbonyl, or nickel pentacarbonyl.

12. A method as claimed in claim 1, wherein the carbon containing gas is carbon monoxide, an oxygen containing organic compound or a hydrocarbon, or a mixture of two or more thereof.

13. A method as claimed in claim 12, wherein the carbon containing gas is carbon monoxide, benzene, toluene, xylene, cumene, ethylbenzene, naphthalene, phenanthrene, anthracene, methane, ethane, propane, hexane, ethylene, propylene, acetylene, formaldehyde, acetaldehyde, acetone, methanol, ethanol or a mixture of two or more thereof.

14. A method as claimed in claim 1, wherein one or more boron and/or nitrogen containing compound is provided in addition to the carbon containing gas.

15. A method as claimed in claim 1, wherein one or more promoter compounds is provided in addition to the carbon containing gas.

16. A method as claimed in claim 15, wherein the promoter compound is thiophene.

17. A method as claimed in claim 1, wherein a diluent gas is provided mixed with the carbon containing gas.

18. A method as claimed in claim 1, wherein the substrate particles are reacted within a fluidised bed.

19. A method as claimed in claim 1, wherein substrate particles are provided and product particles are removed from a reaction vessel in a continuous fashion.

20. A method as claimed in claim 1, further comprising the step of recovering the aligned nanostructures.

21. A method as claimed in claim 1, wherein gaseous effluent from the reaction is recycled with or without clean up.

22. A method as claimed in claim 1, wherein the reaction takes place at a temperature between 650° C. and 1250° C.

23. Carbon nanostructures produced by the method as claimed in claim 1.

24. Carbon nanostructures as claimed in claim 23, wherein the nanostructures are separated from the substrate particles by partial or complete dissolution of the substrate particles or catalyst materials.

* * * * *